(12) United States Patent
Ge et al.

(10) Patent No.: US 10,817,064 B2
(45) Date of Patent: Oct. 27, 2020

(54) MOBILE TERMINAL

(71) Applicant: AAC Technologies Pte. Ltd., Singapore (SG)

(72) Inventors: Huan Ge, Shenzhen (CN); Jiwei Ge, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/705,268

(22) Filed: Dec. 6, 2019

(65) Prior Publication Data
US 2020/0209971 A1 Jul. 2, 2020

(30) Foreign Application Priority Data

Dec. 29, 2018 (CN) .................... 2018 2 2275568 U

(51) Int. Cl.
| | | |
|---|---|---|
| G06F 3/041 | (2006.01) | |
| G06F 3/01 | (2006.01) | |
| H04M 1/02 | (2006.01) | |
| G06F 1/16 | (2006.01) | |
| H04R 5/02 | (2006.01) | |

(52) U.S. Cl.
CPC ............ *G06F 3/016* (2013.01); *G06F 1/1626* (2013.01); *G06F 1/1637* (2013.01); *H04M 1/0266* (2013.01); *H04R 5/02* (2013.01); *H04M 2250/22* (2013.01); *H04R 2499/11* (2013.01)

(58) Field of Classification Search
CPC ...... G06F 1/1626; G06F 1/1637; G06F 3/016; H04M 1/0266; H04M 2250/22; H04R 2499/11; H04R 5/02
See application file for complete search history.

(56) References Cited

U.S. PATENT DOCUMENTS

| | | | |
|---|---|---|---|
| 2012/0149437 A1* | 6/2012 | Zurek | H04R 7/18 455/566 |
| 2015/0153829 A1* | 6/2015 | Shiraishi | G06F 1/1626 345/173 |

* cited by examiner

*Primary Examiner* — Insa Sadio
(74) *Attorney, Agent, or Firm* — W&G Law Group LLP

(57) ABSTRACT

A mobile terminal is provided. The mobile terminal includes a housing, a screen module covering on the housing and cooperatively forming a receiving cavity with the housing, a circuit board received in the receiving cavity, and an exciter sandwiched between the circuit board and the screen module. The exciter includes a base, a coil fixed in the base, and at least two helical springs extending perpendicularly to the circuit board from the base. The at least two helical springs are made of conductive materials. One end of each the helical spring resists against the circuit board and electrically connects the circuit board, the other end of each the helical spring extends into the receiving cavity and electrically connects the coil, and the at least two helical springs are in a compressed state during resisting against the circuit board allowing the base to abut the screen module.

6 Claims, 6 Drawing Sheets

A-A

MOBILE TERMINAL

FIELD OF THE PRESENT DISCLOSURE

The present disclosure relates to the field of electroacoustic conversion, and more particularly to a mobile terminal.

DESCRIPTION OF RELATED ART

With the advent of the mobile internet era, the number of smart mobile devices continues to rise. Among many mobile devices, mobile phone is undoubtedly the most common and portable mobile terminal. Nowadays the mobile phone has diverse functions, one of which is high-quality music. So, sound-emitting devices for emitting sounds are now widely applied to the mobile phones. As the mobile terminal commonly has a limited size, the hardware of the mobile terminal needs to be optimized to adapt the size of the mobile terminal, with the upgrade of the mobile terminal. As a result, for saving space, using an exciter to drive a screen of the mobile terminal to emit sounds is a choice to replace the sound-emitting devices.

In related art, a mobile terminal commonly includes a housing, a screen covered on the housing and cooperatively forming a receiving cavity with the housing, and an exciter accommodated in the receiving cavity and resisting the screen. The exciter vibrates to drive the screen emitting sounds.

In related art, the exciter is fixed on a middle cover of the housing by means of adhesive, screws, or clasps, and a bonding wire is draw forth from the lateral side of the exciter. However, such a structure increases the lateral size of the mobile terminal, which does not take the advantage of structural stacking and space utilization. In addition, using adhesive to fix the exciter can hardly have a perfect performance on the drop reliability for the mobile terminal, and using screws or clasps to fix the exciter also increases the lateral size of the mobile terminal.

Therefore, it is desirable to provide a new mobile terminal to overcome the above-mentioned problems.

BRIEF DESCRIPTION OF THE DRAWINGS

To clearly illustrate the technical solutions that are reflected in various embodiments according to this disclosure, the accompanying drawings intended for the description of the embodiments herein will now be briefly described. It is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION OF THE EXEMPLARY EMBODIMENT

Figure 1:
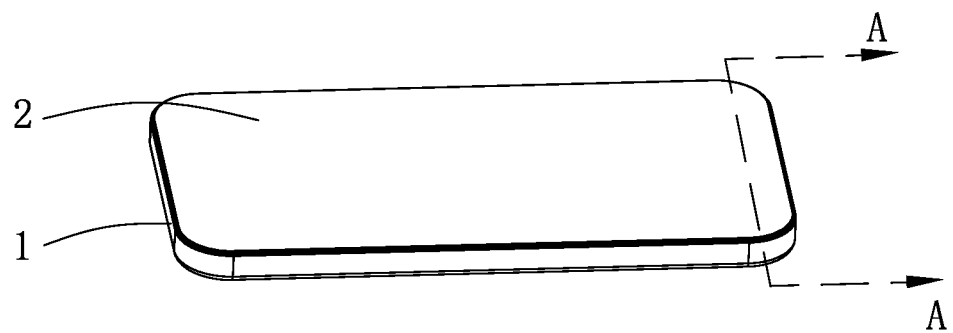
FIG. 1 is a perspective view of a mobile terminal in accordance with an embodiment of the present disclosure.
Figure 2:
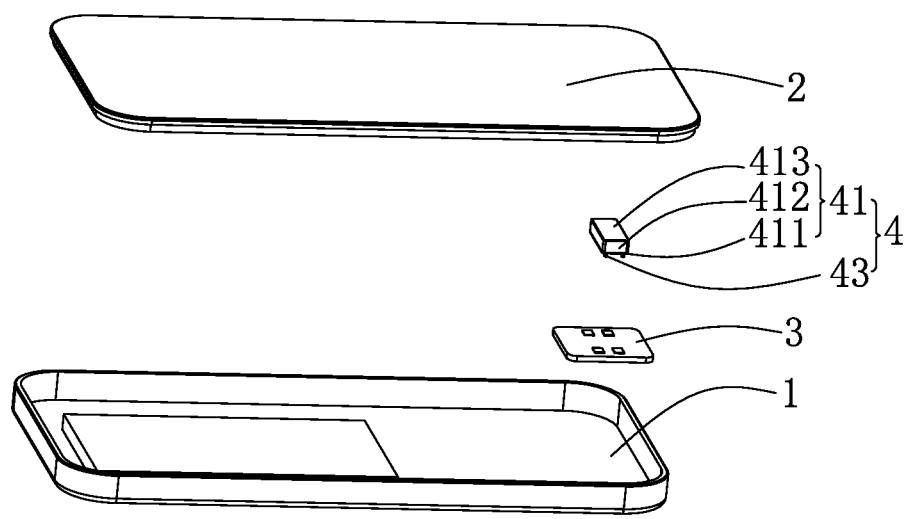
FIG. 2 is an exploded view of part of the mobile terminal in accordance with an embodiment of the present disclosure.
Figure 3:
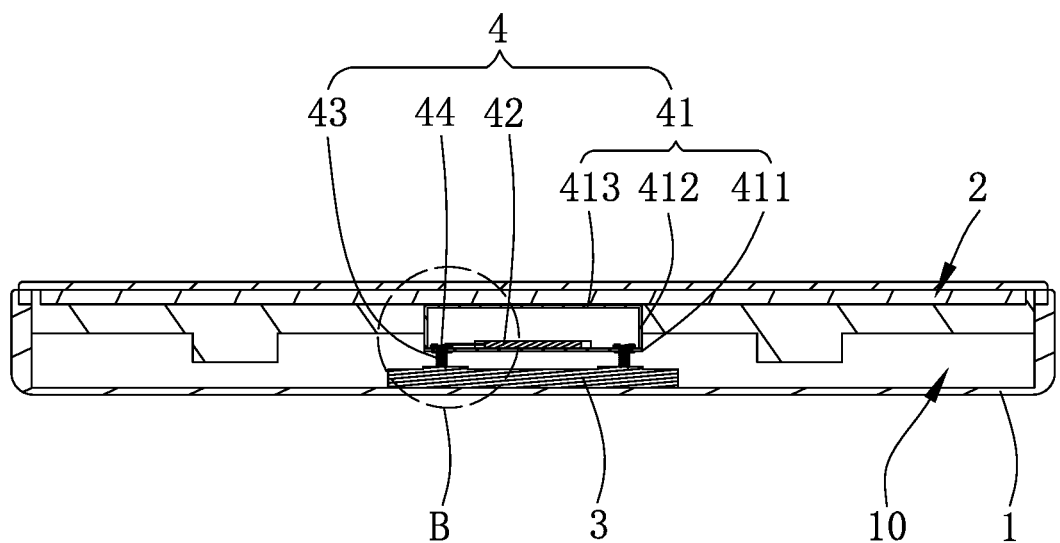
FIG. 3 is a cross-sectional view of the mobile terminal in FIG. 1 taken along line A-A.
Figure 4:
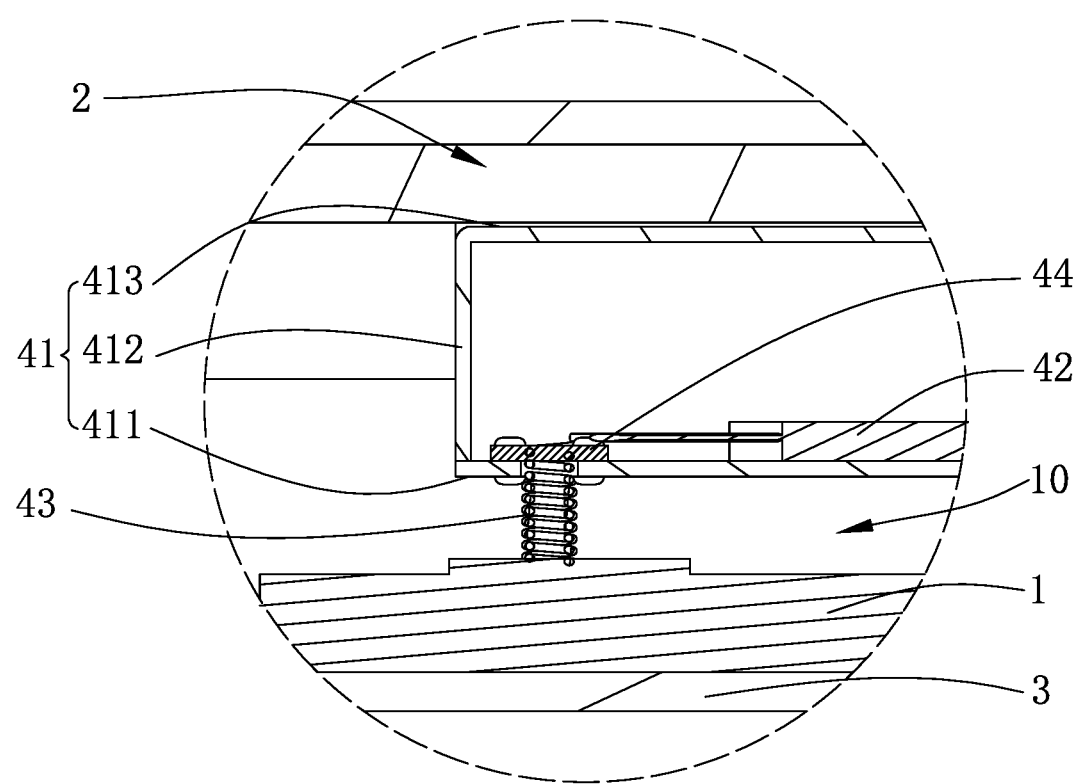
FIG. 4 is an enlarged view of portion B in FIG. 3.

The technical solution of the embodiment of the present disclosure will be clearly and completely described in the following with reference to the accompanying drawings. It is obvious that the embodiment to be described are only a part rather than all of the embodiment of the present disclosure. All other embodiments obtained by persons skilled in the art based on the embodiment of the present disclosure without creative efforts shall fall within the protection scope of the present disclosure.

Please referring to FIGS. 1 to 4, a mobile terminal 100 is provided. The mobile terminal 100 includes a housing 1, a screen module 2, a circuit board 3, and an exciter 4. The terminal 100 may be a mobile phone, a tablet computer, or a telephone watch.

The screen module 2 is covered on the housing 1. The screen module 2 and the housing 1 cooperatively form a receiving cavity 10.

The circuit board 3 is mounted in the receiving cavity 10 and configured to provide electrical signal.

The exciter 4 is sandwiched between the circuit board 3 and the screen module 2 along a thickness direction of the mobile terminal 100.

Specifically, the exciter 4 includes a base 41, a coil 42 fixed in the base 41, and at least two helical springs 43 extending perpendicularly to the circuit board 3 from the base 41. The helical springs 43 are made of conductive materials.

One end of each the helical spring 43 abuts against the circuit board 3 to electrically connect the circuit board 3, and the other end of each the helical spring 43 extends into the receiving cavity 10 and electrically connects the coil 42. The helical springs 43 are in a compression state during abutting against the circuit board 3, making the base 41 resist against the screen module 2.

In the structure described above, the circuit board 3 provides electrical driving signal to the coil 42 through the helical springs 43 to make the exciter 4 vibrate, the screen module 2 then generates resonance with the exciter 4, thereby achieving the purpose of emitting sound by the screen module 2. Meanwhile, the circuit board 3 compresses the helical spring 43 to provide a certain pre-pressure to allow the exciter 4 resisting against the screen module 2, making the exciter 4 be latched therein. The helical springs 43 are in a compressed state under the pre-pressure of the circuit board 3, thus can stretch out and draw back at a certain, which may improve the fixing of the exciter 4, as well as the drop reliability of the mobile terminal 100. In addition, such a structure can be simply assembled and has highly consistency. As a result, the mobile terminal 100 can be ensured to emit a consistent sound.

In the embodiment, the base 41 includes a bottom wall 411 close to the circuit board 3 and spaced from the circuit 3, a side wall 412 extending from the bottom wall 411 towards the screen module 2, and a top wall 413 covered on the side wall 412 and abutted against the screen module 2. Each the helical spring 43 extends from the bottom wall 411 towards the circuit board 3, and the orthographic projection of the helical springs 43 at least partially falls into the bottom wall 411, and preferably falls completely into the bottom wall 411. So that the helical springs 43 are allowed to occupy the space along the thickness direction of the mobile terminal 100, making the space of the mobile terminal 100 being effectively utilized. As such, there is no need to increase the size of the mobile terminal 100 along its length or width direction.

In the embodiment, there are at least two helical springs 43, and the at least two helical springs 43 are symmetrically arranged with regard the bottom wall 411 to ensure the stability of the mobile terminal 100 during the exciter 4 vibrating. The at least two helical springs 43 are made of conductive materials to achieve the introduction of positive and negative signals. The coil 42 has a shape like a racetrack with its leads extending out at a same short axis of the coil. Specifically, the base 41 and the housing 1 are both rectangular, the long axis of the base 41 is parallel to the short axis of the housing 1, that is, the long axis direction of the exciter 4 is parallel to the short axis direction of the mobile terminal 100. The two helical springs 43 are located on a same side of one of the short axis of the bottom wall 411. Specifically, the bottom wall 411 is rectangular, and there are four helical springs 43 which are respectively positioned at the four corners of the bottom wall 411. The four helical springs 43 provide the exciter 4 an enhanced stability, which allows the exciter 4 to resist the screen module 2 much more stably, so that the screen module 2 can vibrate consistently.

Figure 5:
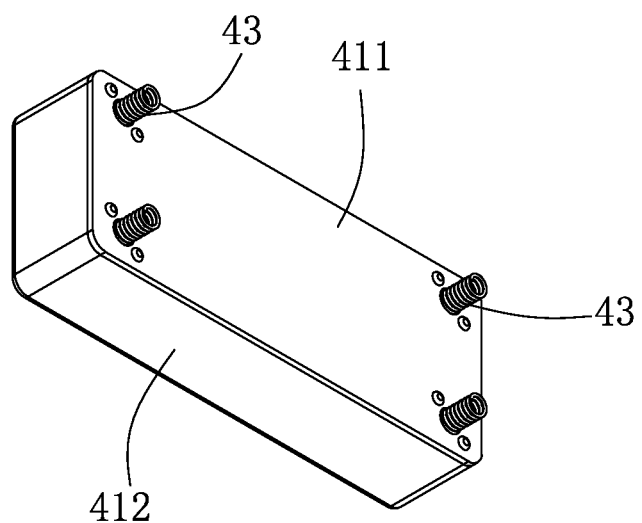
FIG. 5 is a perspective view of an exciter of the mobile terminal in accordance with an embodiment of the present disclosure.
Figure 6:
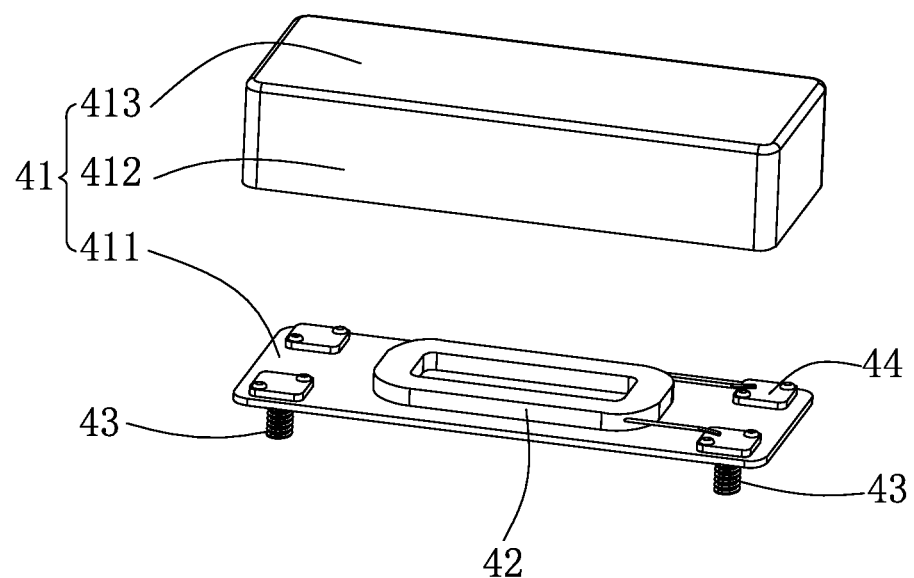
FIG. 6 is an exploded view of part of the exciter in accordance with an embodiment of the present disclosure.

Please referring to FIGS. 5 and 6, in the embodiment, the exciter 4 further includes two bonding pads 44. The two bonding pads 44 are fixed on a side of the bottom wall 411 away from the circuit board 3 and corresponding to the two helical springs 43. Each bonding pad 44 is electrically connected with a corresponding helical spring 43, and both the bonding pads 44 are electrically connected to the coil 42. Specifically, the bottom wall 411 is rectangular, and there are four bonding pads 44 which are respectively positioned at the four corners of the bottom wall 411 and corresponding to the four helical springs 43. To ensure a firm fixing, the bonding pad 44 may be fixed to the bottom wall 41 by rivets. It should be understood that, other fixing manner may also be possible.

Compared to the related art, in the mobile terminal of the present disclosure, the helical springs of the exciter extend from the base towards the circuit board, and the helical springs are in a compression state to allow the base abutting against the screen module. That is, the circuit board compresses the helical springs to provide a certain pre-pressure to allow the exciter resisting against the screen module, making the exciter be latched therein. As the helical springs are made of conductive materials, the coil of the exciter can be electrically connected to the circuit board by the helical springs to acquire electrical signal. As the helical springs extend perpendicularly to the circuit board, the helical springs are compressed along the direction perpendicular to the screen module, which saves the space of the mobile terminal along its length direction. The helical springs are in a compressed state under the pre-pressure of the circuit board, thus can stretch out and draw back at a certain, which may improve the fixing of the exciter, as well as the drop reliability of the mobile terminal. In addition, such a structure can be simply assembled and has highly consistency. As a result, the mobile terminal 100 can be ensured to emit a consistent sound.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A mobile terminal, comprising:
   a housing;
   a screen module covered on the housing, the screen module and the housing cooperatively forming a receiving cavity;
   a circuit board received in the receiving cavity; and
   an exciter sandwiched between the circuit board and the screen module along a thickness direction of the mobile terminal, the exciter driving the screen module to vibrate; wherein
   the exciter comprises
   a base;
   a coil fixed in the base; and
   at least two helical springs extending perpendicularly to the circuit board from the base, the at least two helical springs being made of conductive material;
   one end of each the helical spring resists against the circuit board and electrically connects with the circuit board, the other end of each the helical spring extends into the receiving cavity and electrically connects with the coil, and the at least two helical springs are in a compressed state during resisting against the circuit board allow the base to abut against the screen module.

2. The mobile terminal according to claim 1, wherein the base comprises
   a bottom wall close to the circuit board and spaced from the circuit board;
   a side wall extending bently from the bottom wall towards the screen module; and
   a top wall covered on the side wall and abutted against the screen module;
   each the helical spring extends from the bottom wall towards the circuit board, and an orthographic projection of the helical springs projected on the bottom wall along a direction perpendicular to the circuit board at least partially falls into the bottom wall.

3. The mobile terminal according to claim 2, wherein the at least two helical springs are symmetrically arranged with regard the bottom wall.

4. The mobile terminal according to claim 3, wherein the bottom wall is rectangular, and each the helical spring is one of four helical springs that are positioned at the four corners of the bottom wall.

5. The mobile terminal according to claim 4, wherein the coil has a shape like a racetrack with leads extending out at a same short axis of the coil, the leads electrically connecting the helical springs.

6. The mobile terminal according to claim 4, wherein the exciter further comprises two bonding pads, the two bonding pads being fixed on a side of the bottom wall away from the circuit board and corresponding to two of the helical springs; each bonding pad is electrically connected with a corresponding helical spring, and both the bonding pads are electrically connected to the coil.

* * * * *